United States Patent [19]

Falk

[11] 4,011,522
[45] Mar. 8, 1977

[54] RADIAL FLOW LASER
[75] Inventor: Theodore John Falk, Clarence, N.Y.
[73] Assignee: Calspan Corporation, Buffalo, N.Y.
[22] Filed: Feb. 6, 1974
[21] Appl. No.: 440,214
[52] U.S. Cl. .......................... 331/94.5 G; 330/4.3
[51] Int. Cl.² .................. H01S 3/02; H01S 3/09
[58] Field of Search ............... 331/94.5 D, 94.5 G, 331/94.5 P, 94.5 PE; 239/427.3, 428; 330/4.3

[56] References Cited
UNITED STATES PATENTS
3,646,475  2/1972  Taylor ........................ 331/94.5 D
3,842,363  10/1974  Dobrzelecki et al. ......... 331/94.5 P FOREIGN PATENTS OR APPLICATIONS
2,050,309  5/1971  Germany .................... 331/94.5 D

OTHER PUBLICATIONS

Falk, "Chemical Laser Studies . . . Flow Laser Geometries," 4/21/72, Tech. Report Calspan-WG-51-79-A-2-PT-2.
Falk, "Parametric Studies . . . DF–CO₂ Chemical Transfer Laser," 6/72 Tech. Report CAL-RF-29-66-A-1.

Primary Examiner—Nelson Moskowitz
Attorney, Agent, or Firm—David J. Zobkiw

[57] ABSTRACT

A laser having a radial flow configuration which may be utilized to achieve lasing in both chemically and electrically excited gas lasers.

28 Claims, 19 Drawing Figures

RADIAL FLOW LASER

It is a characteristic of many gas laser systems that the relaxation processes are fast. In order to obtain zones of useful length in which inverted populations of the lasing species exist, it is commonly necessary to operate at low pressures and at high velocities. The combination of low static pressure and high flow velocity leads toward requirements for high pumping capacity and toward corresponding penalties in system weight. The pumping weight penalty can be reduced, however, if it is possible to recover a significant portion of the total pressure of a high Mach number low static pressure flow by means of a suitable diffuser system. The exhaust system requirement is then reduced to the pumping of a smaller volumetric flow rate through a reduced pressure difference to atmospheric pressure. The design of adequate supersonic diffusers is difficult, however, for several reasons. Basic among them is the fact that the Reynolds numbers associated with supersonic lasers are normally low.

ADVANTAGES OF THE RADIAL FLOW LASER

1. Pressure Recovery

The use of radial flow geometry permits a substantial portion of the acceleration of the flow to supersonic speeds to be accomplished in a flow which is free of nozzle walls, that is, which uses the increase in flow cross-sectional area with radius to provide the effective increase in nozzle area. Thus, a key problem in obtaining high pressure recovery, the nozzle wall boundary layer, is circumvented by the use of the radial flow geometry. There does remain some boundary layer in the supersonic region since in the case of the chemical laser, at least, a second reactant must be introduced. The second reactant, however, can be introduced through a series of small diameter radial tubes. Since there is in general no limit other than the structural one to the fluid pressure within these tubes, their diameter can be small, and their surface area can be small compared with the surface area of a conventional supersonic nozzle.

2. Compatibility of Gain Region with Optics

If the master oscillator of a master-oscillator-power-amplifier (MOPA) configuration is of the edge-coupled unstable resonator type, then its output beam will be annular and the annular beam could easily be matched to the radial flow amplifier. An almost inevitable consequence of attempts to increase the operating static pressure of chemical lasers is the shortening in the flow direction of the region of positive gain. In a high power laser of conventional geometry, the amplifying medium thus takes the form of a slab requiring the use of cylindrical optics to produce a beam of reasonable cross section. A short gain region in the case of the radial flow laser still permits the use of conventional axially symmetric optics with a large aperture.

3. Attenuation of Parasitic Modes

Parasitic modes often arise from low glancing angle relfections from the internal surfaces of a conventional laser. However, in the radial flow laser reflections from the inner surface of the outer wall are unlikely to support oscillations since the beam would be required to pass through the normal shock and a region of hot absorbing gas to reach that surface.

4. Area Relief

A conventional supersonic flow laser may be limited in total power per flow channel by the following considerations. The active length in the flow direction is limited by the relaxation flow length which is related to the static pressure and flow velocity. The length parallel to the optical axis is limited by the possibility of parasitic oscillations. The length perpendicular to both the optical axis and the flow direction is limited as well for the following reason. It has been found necessary in chemical lasers, because of boundary layer growth and heat release by the chemical reaction, to provide a cross sectional area increase along the flow channel. Because of the limitations imposed by the zones of influence in a supersonic flow, area relief at the walls of a conventional flow channel cannot be felt upstream of the envelope of Mach cones emanating from the upstream edge of the area relief. Thus area relief is ineffective for flow channels having large dimensions transverse to the flow direction. The radial flow geometry however provides area relief at a rate fixed by the diameter of the optical cavity. At the same time it minimizes the need for area relief by eliminating the nozzle boundary layer. The diameter of the laser must be tailored to the area relief required. However, scaling relationships exist which are peculiar to the radial flow geometry, and some of the advantages listed above may be lost if the laser diameter does not lie within a particular size range.

It is an object of this invention to provide a more efficient laser configuration.

It is a further object of this invention to provide a laser configuration having an improved pressure recovery.

It is an additional object of this invention to provide a radial flow gas laser suitable for use in chemically and electrically excited lasers. These objects, and others as will become apparent hereinafter, are accomplished by the present invention.

In the simplest form of the present invention, as applied to a chemical laser, one of the reactants is introduced through a central cylindrical core tube which is parallel to the optical axis. The flow leaves the core tube through an array of sonic orifices. The sonic orifices may or may not be surrounded by short fairings which serve as rudimentary supersonic nozzles. Because of the radial geometry of the system, the flow after leaving the nozzle array continues to expand and its Mach number continues to increase. Thus the radial geometry of the supersonic source by its nature serves as a supersonic nozzle without walls and thus a key problem in obtaining high pressure recovery, the nozzle wall boundary layer, is circumvented by the use of the radial flow geometry. There does remain some boundary layer in the supersonic region since in the case of the chemical laser, at least, a second reactant must be introduced. The second reactant, however, can be introduced through a series of small diameter radial tubes or "spoke nozzles". Since there is in general no limit other than the structural one to the fluid pressure within these tubes, their diameter can be small, and their surface area will be negligible compared with the surface area of a conventional supersonic nozzle.

At some radial position determined by the pressure of the ambient gas, a cylindrical normal shock will form followed by additional subsonic diffusion again associated with the cylindrical geometry. There will, of course, be some influence of the end wall boundary layer since the cylinder cannot be infinitely long. Nevertheless, if the cylinder is reasonably long the overall influence of the boundary layer will be less in this configuration than in a conventional one, and, provided that the flow is steady, the pressure recovery should be very close to the normal shock value.

If normal shock recovery is not sufficient, then it is possible to obtain a still higher pressure recovery by adding "blades" downstream of the laser cavity. Such blades can be designated to function more efficiently than a conventional supersonic diffuser since their performance is not handicapped by the existence of a thick low energy boundary layer. The semi-vertex angle of a simple wedge airfoil, for example, could be much greater than the turning angle allowable for a normal diffuser wall. Although "cookie cutter" diffusers are also helpful in conventional flow channels, the inability of the wall boundary layer to negotiate a large pressure rise still limits diffuser performance in such designs.

In certain cases the spoke nozzle configuration previously described may not be completely satisfactory. It is still possible, however, to obtain some of the advantages of the radial flow geometry by adapting conventional supersonic nozzles to the radial flow geometry. One such adaptation would be to wrap the nozzles around a central axis to form circumferentially extending, radially directed nozzles. Another adaptation is to provide a flow path defined by radially extending ports in the wall of the central core tube.

BRIEF DESCRIPTION OF THE DRAWINGS

For a fuller understanding of the present invention, reference should now be had to the following detailed description thereof taken in conjunction with the accompanying drawings wherein.

DESCRIPTION OF THE PREFERRED EMBODIMENTS

Figure 1:
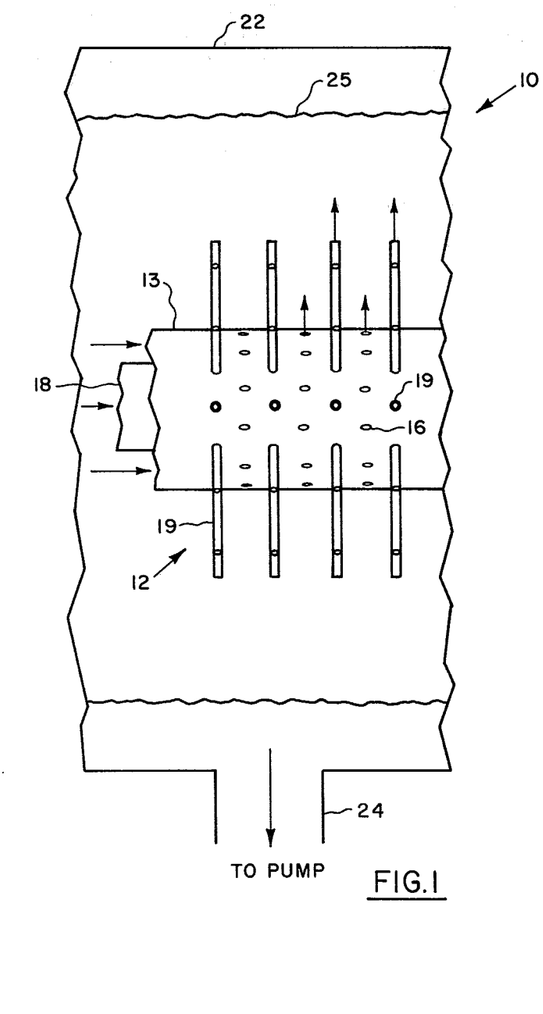
FIG. 1 is a schematic diagram of a portion of a radial flow laser.
Figure 2:
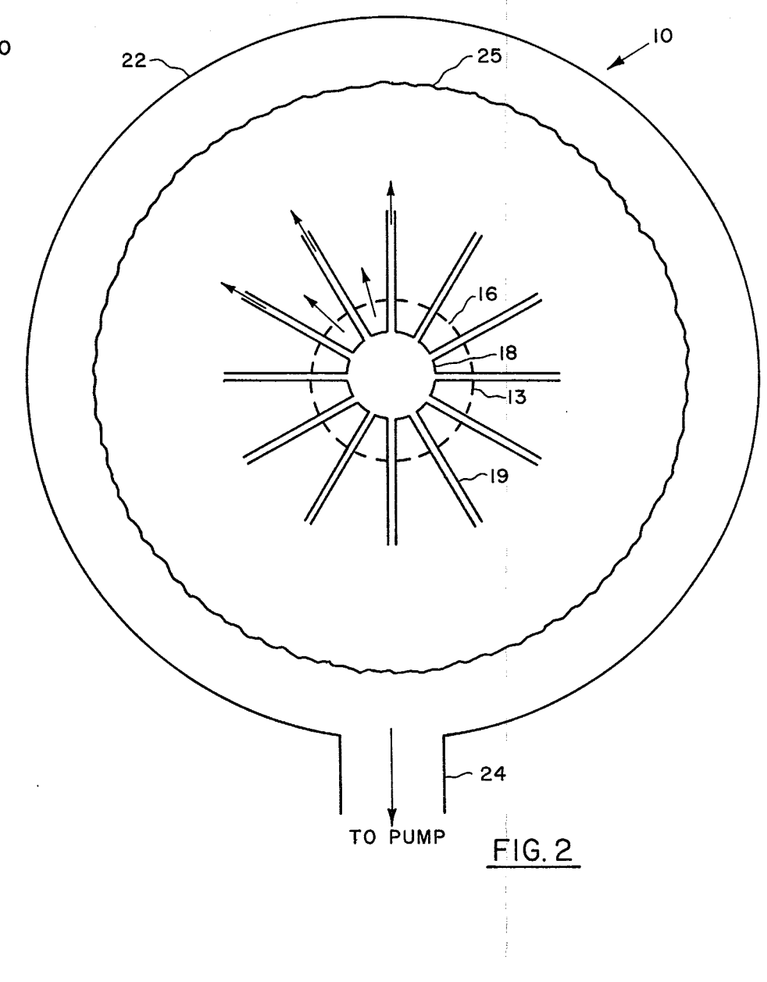
FIG. 2 is a sectional schematic diagram of the radial flow laser of FIG. 1.
Figure 3:
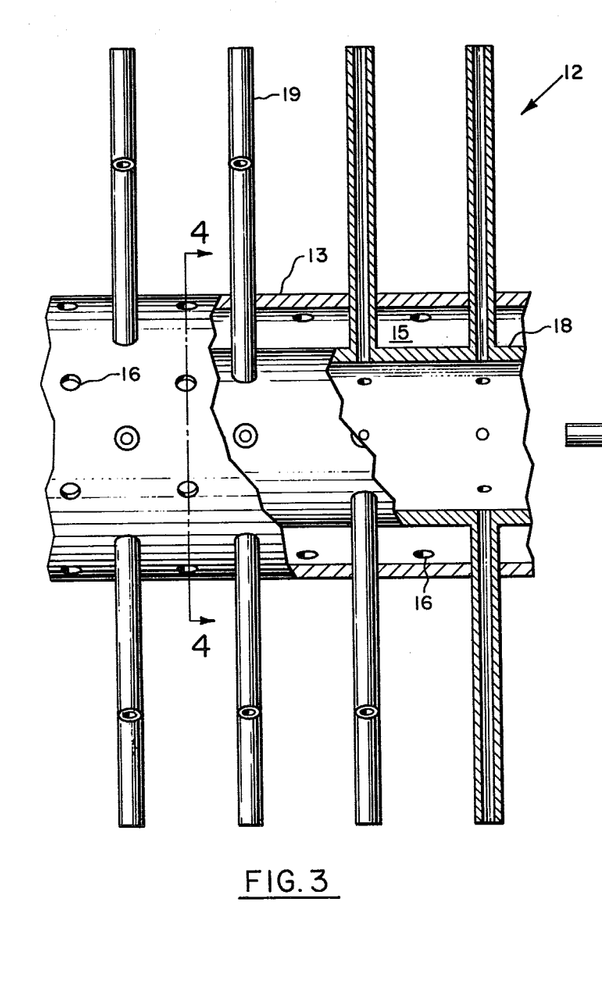
FIG. 3 is a detailed partially sectional view of the primary and secondary gas supply structure of the radial flow laser of FIG. 1.
Figure 4:
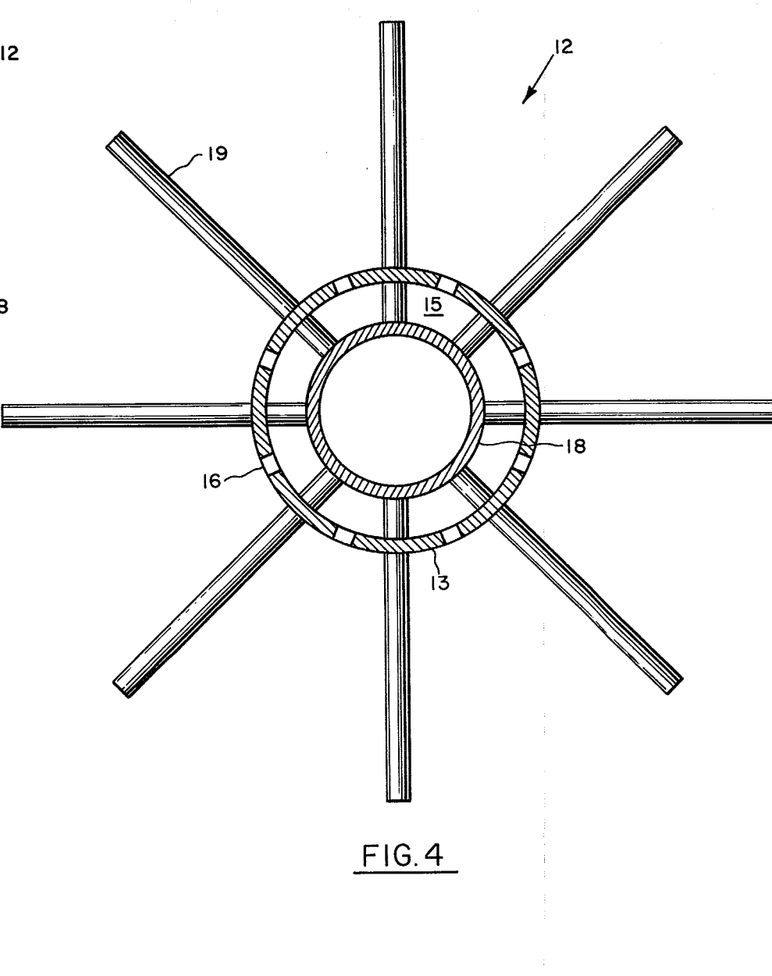
FIG. 4 is a sectional view taken along line 4—4 of FIG. 3.

In FIGS. 1 and 2, the numeral 10 generally designates a chemical laser which includes a primary and secondary gas supply structure generally designated 12. As best shown in FIGS. 3 and 4, gas supply structure 12 includes a central cylindrical core tube 13 which is parallel to the optical axis of laser 10 and surrounds a second tube 18 and together with tube 18 defines a generally annular chamber 15. An array of radially located sonic orifices 16 is provided in the walls of core tube 13. Tube 18 is provided with a series of small diameter radial tubes or spokes nozzles 19. Gas supply structure 12 is surrounded by a containing shell 22 having an outlet 24 connected to an exhaust pump (not shown).

Only eight spoke nozzles 19 and sonic orifices 16 have been illustrated in FIGS. 3 and 4 in the interest of clarity of illustration, in a practical device, however, many more would be present. As for example, the outer ends of the spoke nozzles 19 would be less than one inch apart and the total number would be a function of the length of the spoke nozzles 19. Obviously, it is desirable to have a seal between spoke nozzles 19 and core tube 13. The nature of the seal will depend upon the method of manufacturing primary and secondary gas supply structure 12 which will in turn be influenced by such factors as the dimensions of the laser cavity.

Figure 5:
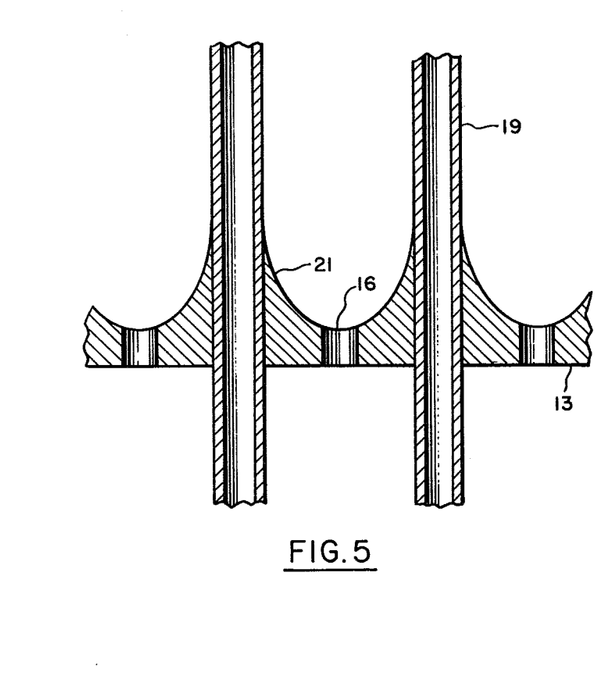
FIG. 5 is a partial sectional view of a modified primary and secondary gas supply structure.

In FIG. 5 the structure is similar to that of FIGS. 3 and 4 and the same numerals have been used to designate like structure. The gas supply structure of FIG. 5 differs from that of FIGS. 3 and 4 in that fairings 21 are provided to afford a smooth transition between sonic orifices 16 and spoke nozzles 19.

Figure 6:
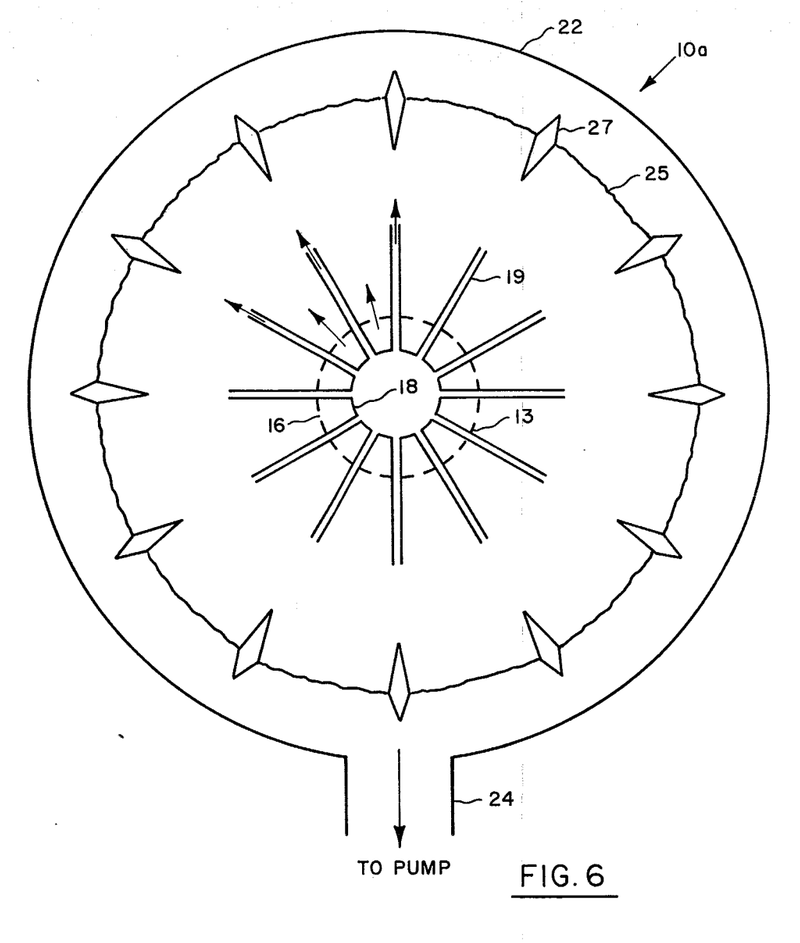
FIG. 6 is a sectional schematic diagram of a radial flow laser having a supersonic diffuser configuration.

The chemical laser 10a of FIG. 6 is similar to that of FIGS. 1 and 2 except for the presence of diffuser blades 27 and, therefore, the same numerals have been used to label similar structure.

Figures 7, 8, 9:
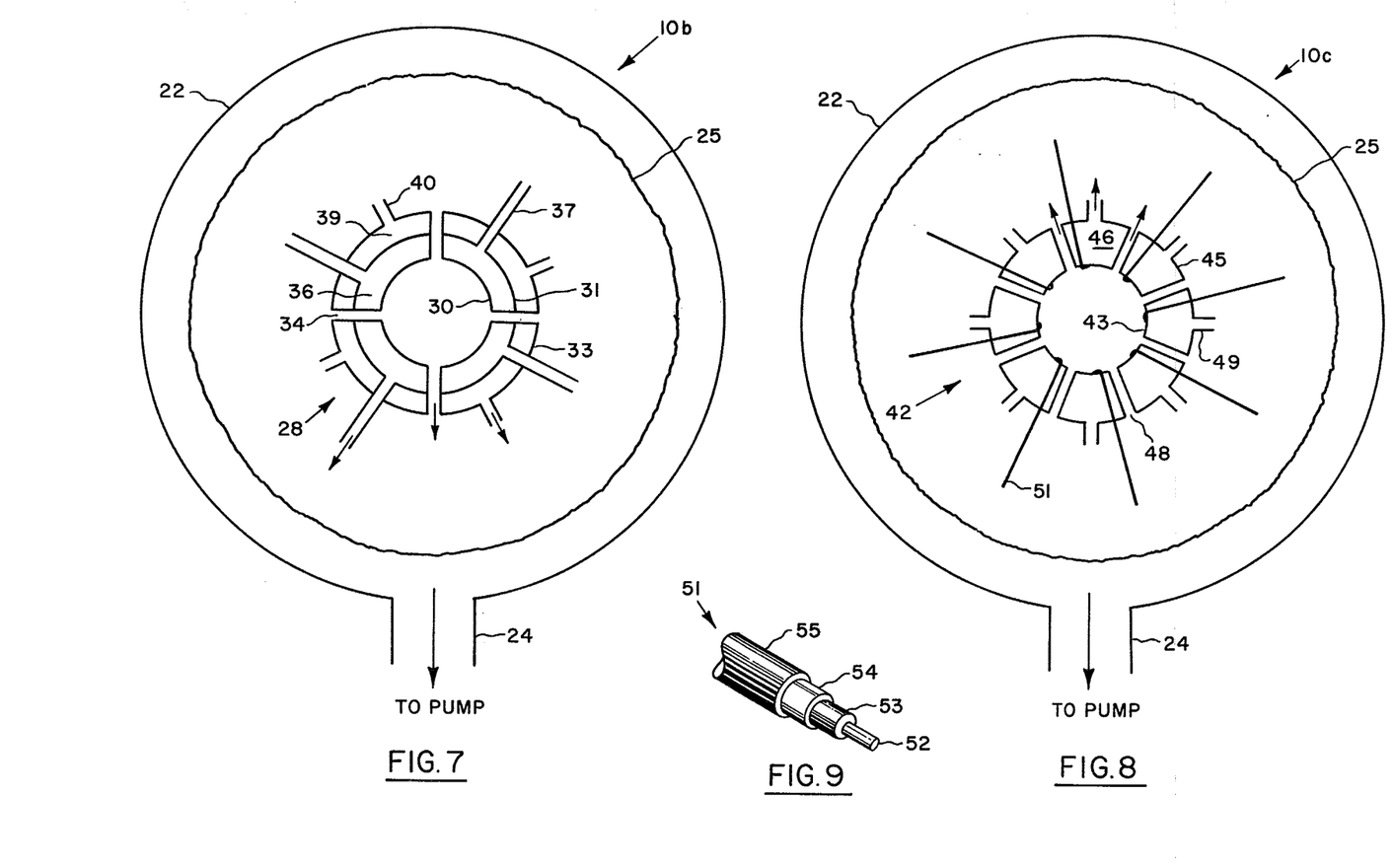
FIG. 7 is a sectional schematic diagram of a thermally dissociated, radial flow laser.
FIG. 8 is a sectional schematic diagram of an electrically initiated radial flow chemical laser.
FIG. 9 is an isometric view of the electrode structure of FIG. 8.

The thermally dissociated chemical laser 10b of FIG. 7 is similar to that of FIGS. 1–4, except for the presence of supply structure for a third gas, and like numerals have been used to label similar structure. The gas supply structure is generally designated 28 and includes central core tube 30, inner cylindrical core tube 31 and outer cylindrical core tube 33. Central core tube 30 has a radial array of sonic orifices 34 extending from the interior of core tube 30 through core tubes 31 and 33. Central core tube 30 together with inner cylindrical core tube 31 defines a first generally annular cavity 36 having a radial array of sonic orifices 37 extending from the interior of annular cavity 36 through outer core tube 33 to a point radially outward of core tube 33. Core tube 31 together with outer core tube 33 defines a second generally annular cavity 39 having a radial array of sonic orifices 40 extending to a point radially outward of outer core tube 33 but radially inward of sonic orifices 37.

The electrically initiated laser 10c of FIG. 8 is similar to that of FIGS. 1–4, except for the presence of the electrical discharge structure, and like numerals have been used to label similar structure. The gas supply structure is generally designated 42 and includes central core tube 43 which is surrounded by outer core tube 45 and together therewith defines generally annular chamber 46. Central core tube 43 has a radial array of sonic orifices 48 extending from the interior of core tube 43 through core tube 45. A radial array of sonic orifices 49 extend from core tube 45 to a point radially outward of sonic orifices 48. Electrical discharge structure generally designated 51 extends radially outward from core tube 45 past sonic orifices 49. As best shown in FIG. 9, electrical discharge structure 51 includes a central conductor 52 which is separated from surrounding conductor 54 by insulator 53. Conductor 54 is covered by insulator 55. The ends of conductors 52 and 54 are axially spaced to provide a desired spark gap.

Figure 10:
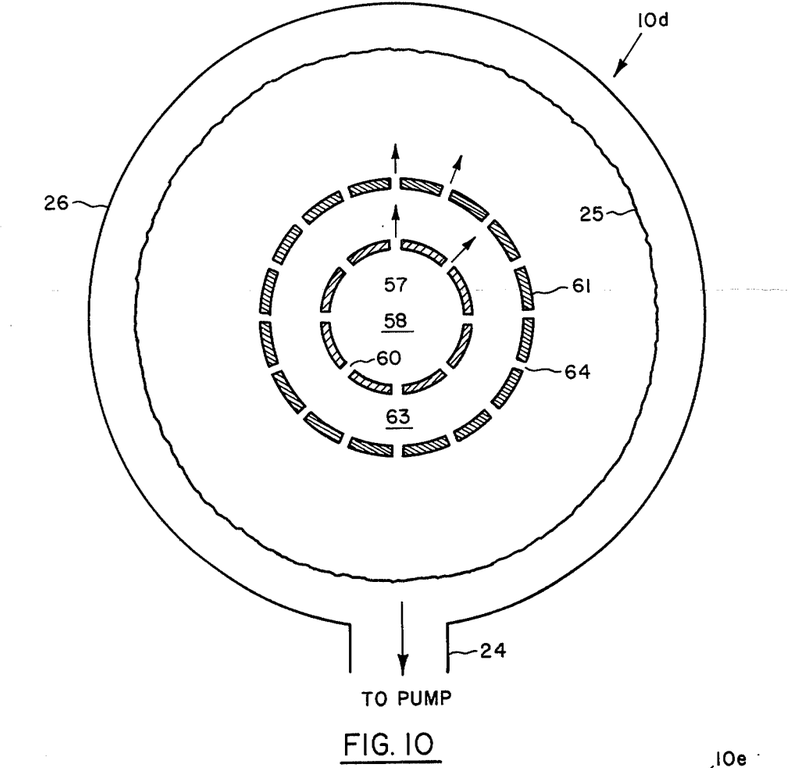
FIG. 10 is a sectional schematic diagram of an electrically excited laser with radial discharge.

In the electrically excited laser 10d of FIG. 10 inner core tube 57 defines a chamber 58 and has a radial array of sonic orifices 60 extending therethrough. Outer core tube 61 together with inner core tube 57 defines an annular chamber 63. A radial array of sonic orifices 64 is located in outer core tube 61. end pieces (not shown) coact with core tubes 57 and 61 to define chambers 58 and 63 and provide electrical insulation between core tubes 57 and 61 which are connected to an electrical power source (not shown) and act as electrodes.

Figure 11:
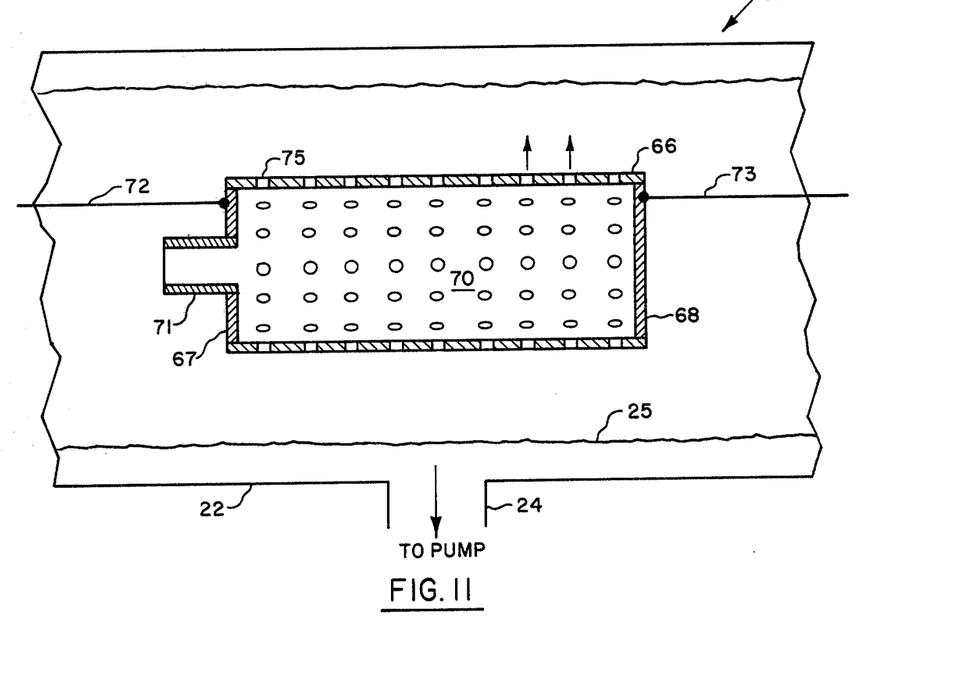
FIG. 11 is a sectional schematic diagram of an electrically excited laser with longitudinal discharge.

In the electrically excited laser 10e of FIG. 11 tube 66 together with end plates 67 and 68 defines a chamber 70. Inlet line 71 provides fluid communication between chamber 70 and a gas supply (not shown). End plates 67 and 68 are electrically insulated from each other and are connected to a source of electrical power (not shown) via lines 72 and 73, respectively, and act as electrodes. Sonic orifices 75 provide an outlet from chamber 70.

Figure 12:
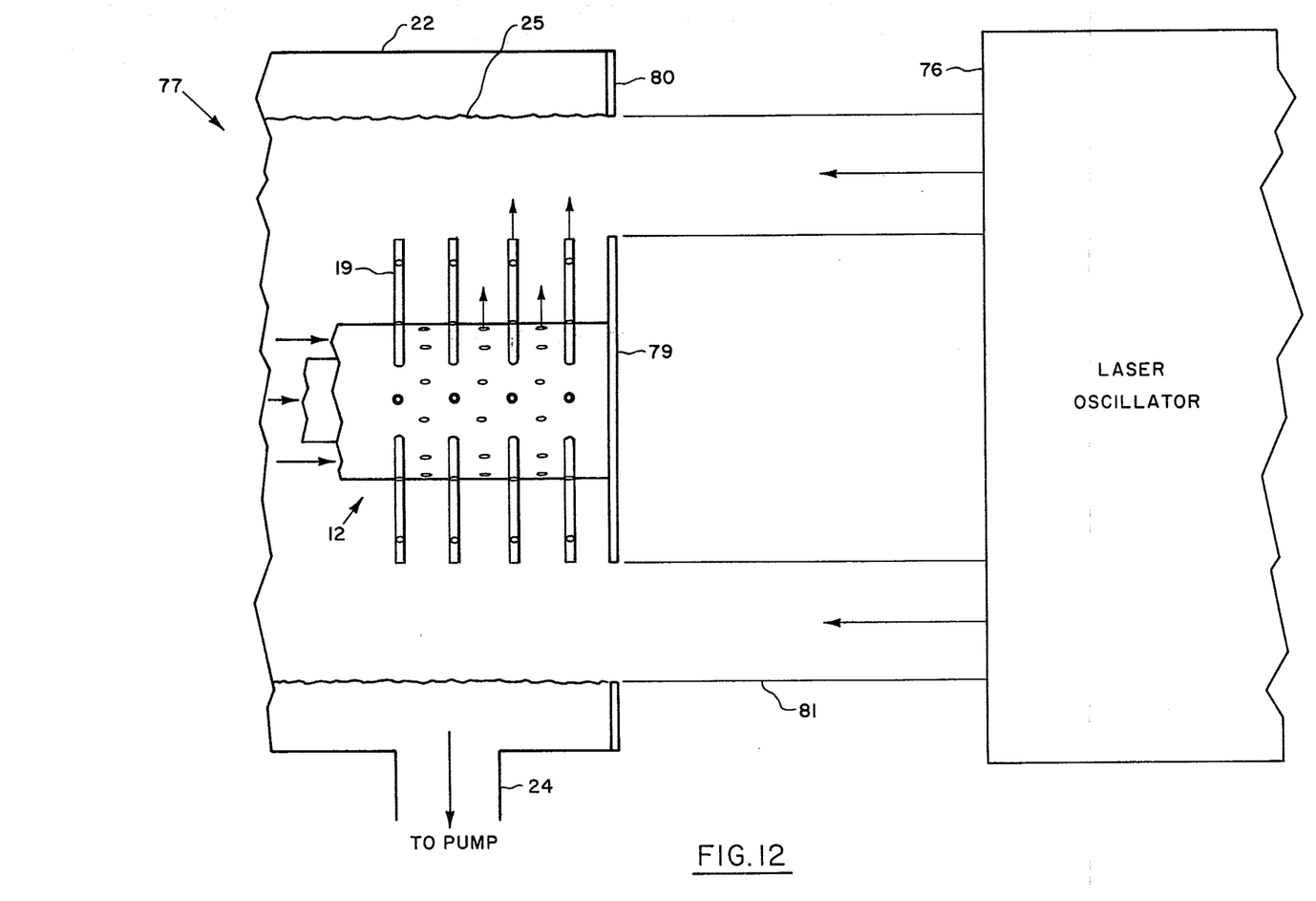
FIG. 12 is a schematic diagram of a radial flow laser employed in a master-oscillator power amplifier configuration.

FIG. 12 illustrates a chemical laser employing a radial flow power amplifier 77 in a master-oscillator-power-er-amplifier (MOPA) configuration with laser oscillator 76 and the same numerals used in FIGS. 1 and 2 have been used to label similar structure. End plates 79 and 80 together provide a generally annular opening which is axially aligned with the gain region of laser oscillator 76. Generally annular beam 81, indicated by arrows, is in alignment with the gain regions of laser oscillator 76 and of radial flow power amplifier 77. Because the primary and secondary gas supply structure 12 is supplied from the output end of the laser structure, the output beam produced would be generally annular in form with a sector missing to permit the gas supply structure to connect with primary and secondary gas supply structure 12.

Figure 13:
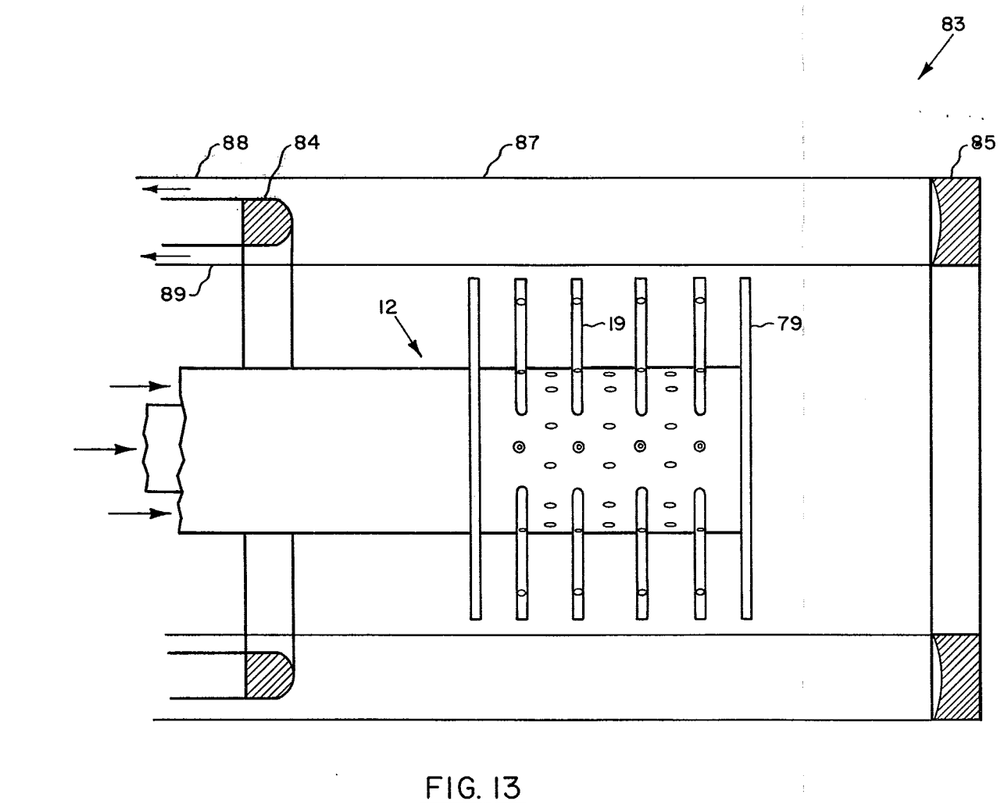
FIG. 13 is a schematic diagram of a radial flow oscillator.

In FIG. 13, the numeral 83 generally designates as oscillator employing a radial flow configuration and the same numerals used in FIGS. 1, 2 and 12 have been used to label similar structure. The primary and secondary gas supply structure 12 is located in axial alignment with and is intermediate axially spaced mirrors 84 and 85 which produce first annular beam 87 in the gain region and produce concentric annular output beams 88 and 89.

Figure 14:
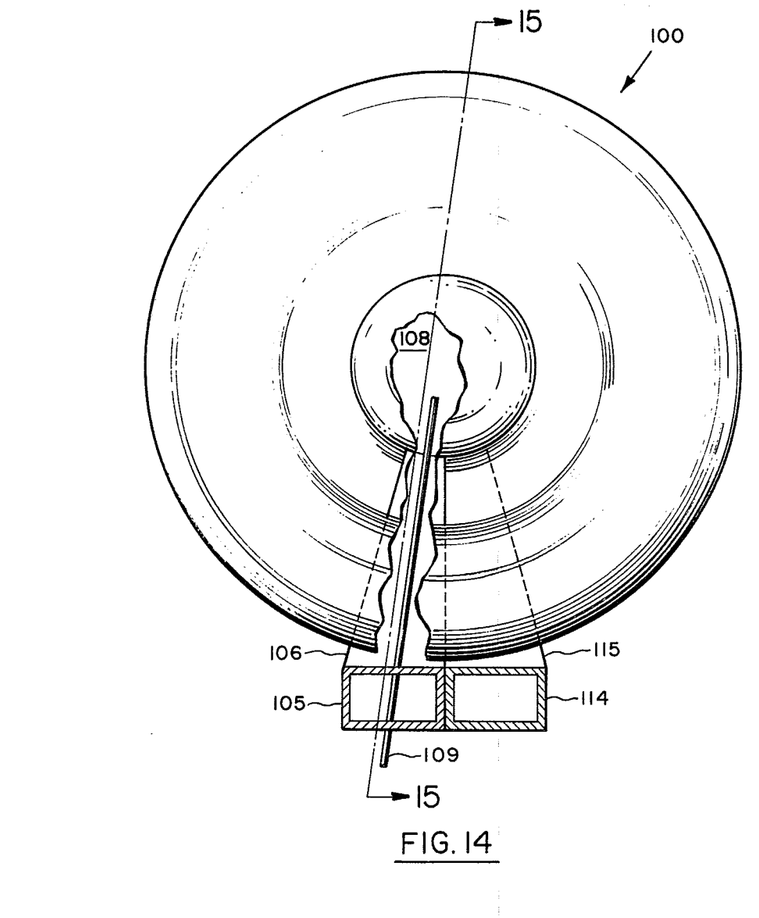
FIG. 14 is a detailed partially sectional view of the primary and secondary gas supply structure of a radial flow gas laser employing conventional nozzles.
Figure 15:
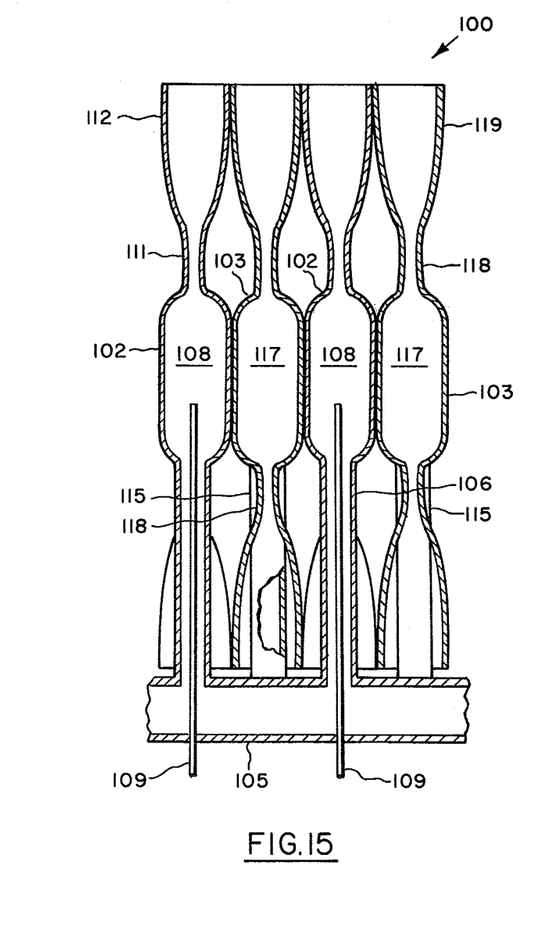
FIG. 15 is a sectional view taken along line 15—15 of FIG. 14.

In FIGS. 14 and 15 the numeral 100 generally designates the primary and secondary gas supply structure of a radial flow laser. The primary and secondary gas supply structure 100 is made up of a series of primary gas supply members 102 which are axially separated by a series of secondary gas supply members 103. Tubes 105 and 106 supply a first reactant and a diluent to chamber 108 located in primary gas supply member 102. A second reactant is supplied to chambers 117 located in secondary gas supply member 103 via tubes 114 and 115. A third reactant is supplied to chambers 108 via lines 109 and the resultant thermally dissociated product, remaining reactants and diluent pass from chambers 108 through essentially circumferentially extending restrictions 111 to essentially circumferentially extending supersonic nozzles 112. The second reactant passes from chambers 68 through essentially circumferentially extending restrictions 118 to essentially circumferentially extending supersonic nozzles 119.

Figure 16:
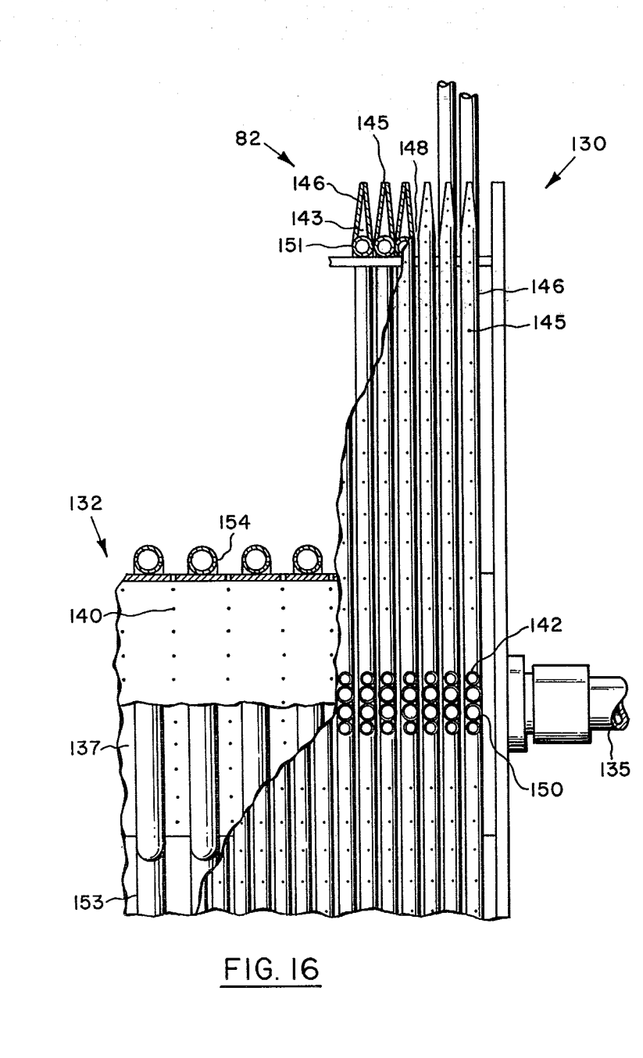
FIG. 16 is a partial, partially sectional side view of the primary and secondary gas supply of a second embodiment of a conventional-nozzle radial-flow chemical laser.
Figure 17:
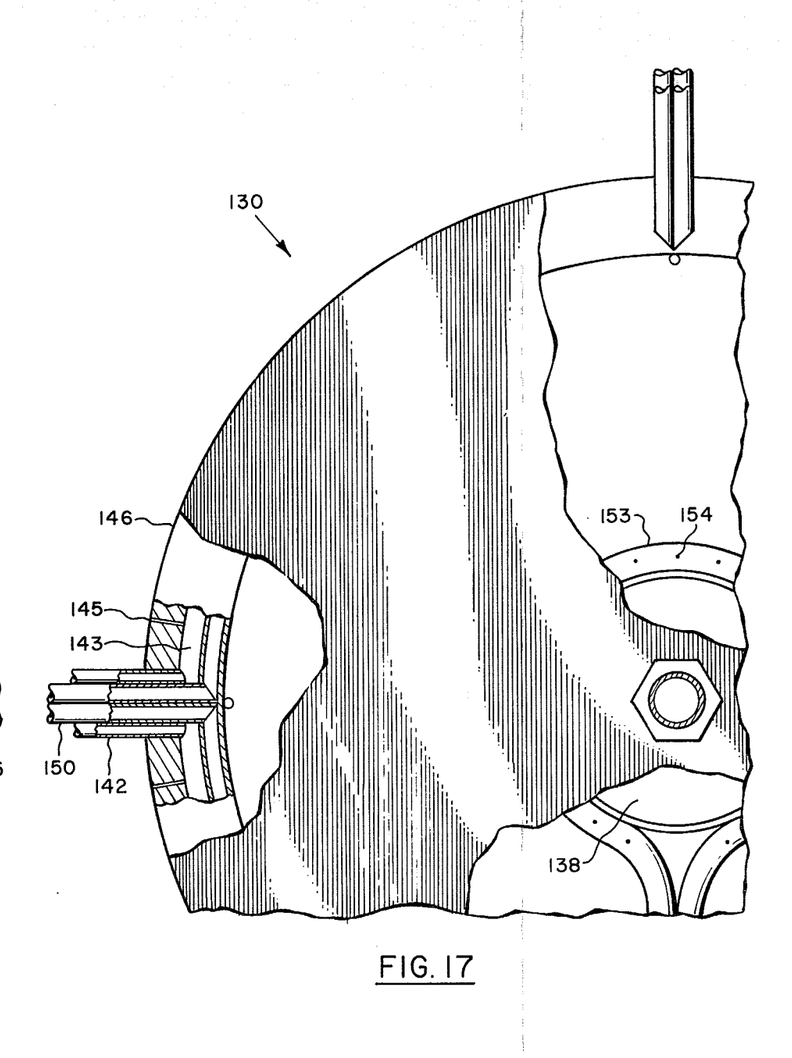
FIG. 17 is a partial, partially sectioned end view of the radial flow laser of FIG. 16.
Figure 18:
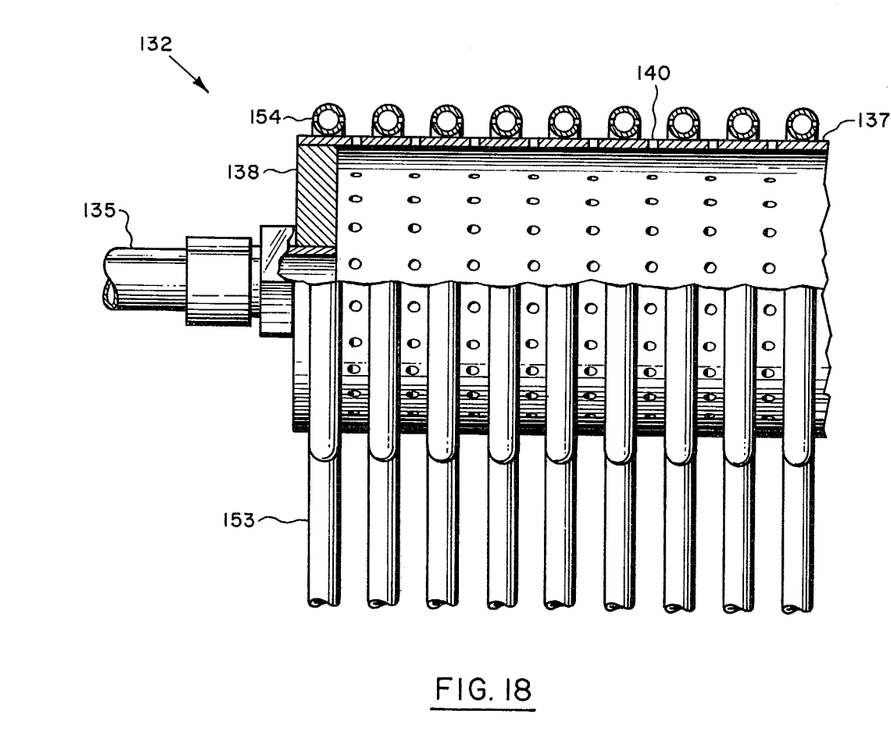
FIG. 18 is a detailed partially sectioned side view of the primary gas supply structure of the radial flow laser of FIG. 16.
Figure 19:
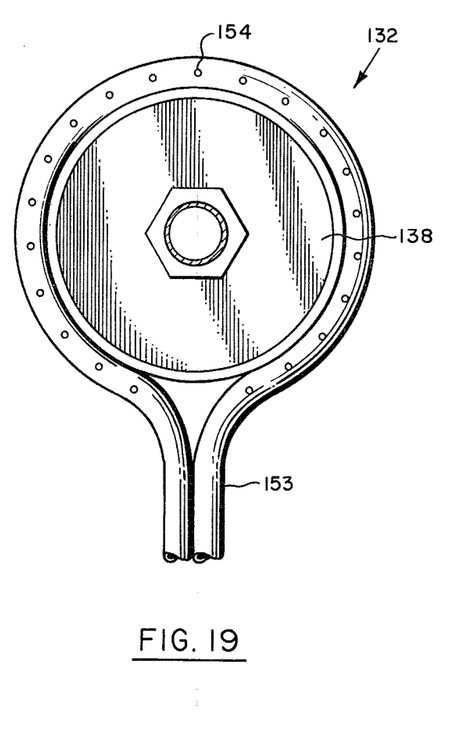
FIG. 19 is a detailed end view of the primary gas supply structure of FIG. 18.

In FIGS. 16 and 17, the numeral 130 generally designates a chemical laser which includes a primary and a secondary gas supply structure generally designated 132 and 133, respectively. As best shown in FIGS. 18 and 19, primary gas supply structure 132 includes a central cylindrical core tube 137 having an end wall 138 and which is supplied with a first reactant and diluent mixture via line 135. The mixture of diluent and first reactant passes from core tube 137 via orifices 140. The secondary gas supply structure 133 includes tubes 142 and chambers 143 for supplying a second reactant to a plurality of radially extending orifices 145 located in a plurality of axially spaced members 146 coacting to define restrictions 148. Coolant is supplied to axially spaced members 146 via lines 150 and 151. A third reactant is supplied to tubes 153 which essentially circumferentially surround core tube 137 intermediate the circumferentially located orifices 140. Tubes 153 are provided with a series of orifices 154 disposed parallel to the axis of the core tube 137.

OPERATION

In the device of FIGS. 1 and 2, one of the reactants, designated the primary reactant, is introduced into the annular chamber 15 defined by core tube 13 and tube 18. The primary reactant passes from chamber 15 through sonic orifices 16 located in core tube 13. If the ambient pressure is low enough the orifices 16 become choked and because of the radial geometry of the system, the flow after leaving sonic orifices 16 continues to expand and its Mach number continues to increase. Thus the radial geometry of the supersonic source by its nature serves as a supersonic nozzle without walls. Some boundary layer does remain in the supersonic region since in the case of the chemical laser, at least, a second reactant must be introduced. However, by introducing the second reactant through a series of small diameter radial tubes 19 which are supplied with the second reactant by tube 18 their surface area is smaller than the surface area of a conventional supersonic nozzle. The secondary gas is injected at a radius where the flow has reached the desired Mach number and the primary and secondary reactants react in a gain region where a population inversion will be achieved. At some radial position determined by the pressure of the ambient gas, a cylindrical normal shock 25 will form followed by additional subsonic diffusion again associated with the cylindrical geometry. There will be some influence of the end wall boundary layer (not shown) since the cylinder defined by shell 22 cannot be infinitely long. Nevertheless, if shell 22 is reasonably long the overall influence of the boundary layer will be less than in a conventional configuration, and, provided that the flow is steady, the pressure recovery will be very close to the normal shock value.

If it is desirable to avoid leaving a region filled with stagnant gas downstream of orifices 16, the gas supply structure 12 of FIGS. 1–4 may be modified as shown in FIG. 5. Fairings 21 provide a smooth transition between sonic orifices 16 and spoke nozzles 19 and serve as rudimentary supersonic nozzles.

If normal shock recovery is not sufficient, the device of FIGS. 1 and 2 may be modified to that of FIG. 6 by the addition of diffuser blades 27 downstream of the laser cavity in order to obtain higher pressure recovery. Since the performance of blades 27 is not handicapped by the existence of a thick low energy boundary layer, blades 27 will function more efficiently than a conventional supersonic diffuser.

The operation of the FIG. 7 device will be described in terms of a DF-$CO_2$ laser. Fluorine molecules and atoms ($F_2$ and F) produced by thermal dissociation either within the core tube or external to it, either by a chemical reaction or some other heat source are supplied to central core tube 30 and pass therefrom via the radial array of sonic orifices 34. Carbon dioxide is supplied to annular cavity 39 and passes therefrom via the radial array of sonic orifices 40 and mixes with the fluorine molecules and atoms passing from sonic orifices 34. Deuterium is supplied to annular cavity 36 and passes therefrom via sonic orifices 37. As they pass radially outward from gas supply structure 28 the fluorine and carbon dioxide mix and then contact the deuterium. The fluorine and deuterium react in an exothermal reaction to produce deuterium fluoride in a self sustaining reaction and an energy transfer takes place between the deuterium fluoride and the carbon dioxide to excite vibrationally the carbon dioxide to thereby produce a population inversion. At some radial position determined by the pressure of the ambient gas, a cylindrical normal shock 25 will form followed by additional subsonic diffusion.

The operation of the FIG. 8 device will be described in terms of an electrically excited DF-$CO_2$ laser. Fluorine gas is supplied to central core tube 43 and passes therefrom via the radial array of sonic orifices 48. Deuterium, carbon dioxide and diluent are supplied to annular cavity 46 and pass therefrom via the radial array of sonic orifices 49 and mix with the fluorine passing from sonic orifices 48. The mixture passes radially outward where a spark gap occurs in electrical discharge structures 51 which initiates a chemical reaction between the fluorine and deuterium which reaction continues as described above in regard to FIG. 7.

In the device of FIG. 10 one of said core tubes 57 and 61 is connected to an electrical power source (not shown) and acts as an anode and the other core tube acts as a cathode. Gas supplied to chamber 58 passes through sonic orifices 60 into chamber 63 where an electrical discharge between the electrode defining core tubes 57 and 61 excites the gas. A population inversion is produced in the gas either within chamber 63 or after the gas has passed from chamber 63 via sonic orifices 64.

In the device of FIG. 11 one of the end plates 67 and 68 which are connected to a source of electrical power via lines 72 and 73, respectively, acts as an anode and the other as a cathode. Gas is supplied to chamber 70 via inlet line 71 and when acted on by an electrical discharge across end plates 67 and 68 produces a population inversion in the gas which then passes from chamber 70 via sonic orifices 75.

The device of FIG. 12 takes advantage of the compatibility of the cylindrical gain region with the output beam of an edge-coupled unstable resonator. When the master-oscillator of a MOPA configuration is an edge-coupled resonator, the output beam 81 is generally annular. Annular output beam 81 is easily matched to the radial flow amplifier 77 and passes through the gain region to increase its gain.

An almost inevitable consequence of attempts to increase the operating static pressures of chemical lasers is the shortening in the flow direction of the region of positive gain. In a high power laser of conventional geometry, the amplifying medium thus takes the form of a slab requiring the use of cylindrical optics to produce a beam of reasonable cross section. A short gain region in the case of the radial flow configuration, as evidenced by the device of FIG. 12, still permits the use of conventional axially symmetric optics with a large aperture.

In the device of FIG. 13, the reactants supplied by primary and secondary gas supply structure 12 react in an annular gain region generally defined by annular beam 87. Annular mirrors 84 and 85 coact to reflect a portion of the output back through the gain region before exiting in the form of annular coaxial output beams 88 and 89. Although the reflecting surfaces of annular mirrors 84 and 85 have been shown as convex and concave, respectively, a number of different mirror systems having different radii of curvature would be adaptable to this geometry.

In the device of FIGS. 14 and 15 fluorine may be the first reactant, deuterium the second reactant, hydrogen the third reactant and helium the diluent. The fluorine which is supplied to chamber 108 via tubes 105 and 106 reacts with the hydrogen supplied via lines 109 in an exothermic reaction which thermally dissociates part of the fluorine. Fluorine molecules, fluorine atoms, hydrogen fluoride gas and helium pass from chamber 108 via restrictions 111 and supersonic nozzles 112. The deuterium which is supplied to chamber 117 via tubes 114 and 115 passes from chamber 117 via restrictions 118 and supersonic nozzles 119. The deuterium passing from secondary gas supply member 103 acts with the fluorine atoms passing from primary gas supply member 102 according to the following reactions which result in lasing:

In the device of FIGS. 16 and 17, fluorine may be the first reactant, deuterium the second reactant, hydrogen the third reactant and helium the diluent. The fluorine which is supplied to central cylindrical core tube 137 passes from core tube 137 through the radially extending orifices 140 and reacts with the hydrogen supplied via tubes 153 and orifices 154 in an exothermic reaction which thermally dissociates a portion of the fluorine. The fluorine molecules, fluorine atoms, hydrogen fluoride gas, and helium expand radially and pass through essentially circumferentially extending restrictions 148 which are formed by members 146 which have a spacing of about 0.01 inches. Deuterium passing from orifices 145 reacts with the fluorine atoms which results in lasing.

Although preferred embodiments of the present invention have been illustrated and described, other changes will occur to those skilled in the art. For example, one or more of the reactants may be heated to promote the chemical reactions. It is therefore intended that the scope of the present invention is to be limited only by the scope of the appended claims.

I claim:

1. A method for producing a population inversion in a laser device by the reacting of first and second reactants including the steps of:
   supplying the first and second reactants to supply means located in the interior of the laser device;
   radially delivering the first reactant from the supply means;
   radially expanding the first reactant to a desired Mach number;
   reacting the second reactant with the expanded first reactant whereby a population inversion is achieved.

2. The method of claim 1 wherein a third reactant is added to said first reactant to thereby cause dissociation of a portion of said first reactant prior to the reacting of said first and second reactants.

3. The method of claim 1 wherein the step of radially expanding the first reactant to a desired Mach number includes accelerating the first reactant to supersonic speeds in a flow free of nozzle walls.

4. The method of claim 3 wherein a third reactant is added to said first reactant to thereby cause dissociation of a portion of said first reactant prior to the reacting of said first and second reactants.

5. The method of claim 1 wherein the step of radially expanding the first reactant to a desired Mach number includes increasing the flow crosssectional area with radius to provide an effective increase in nozzle area.

6. The method of claim 5 wherein a third reactant is added to said first reactant to thereby cause dissociation of a portion of said first reactant prior to the reacting of said first and second reactants.

7. The method of claim 1 further including the step of passing the expanded first reactant through supersonic nozzle means prior to the step of reacting the second reactant with the expanded first reactant.

8. The method of claim 7 wherein a third reactant is added to said first reactant to thereby cause dissociation of a portion of said first reactant prior to the reacting of said first and second reactants.

9. The method of claim 1 wherein the step of radially delivering the first reactant from the supply means includes passing the first reactant through radially extending sonic orifices.

10. The method of claim 9 wherein a third reactant is added to said first reactant to thereby cause dissociation of a portion of said first reactant prior to the reacting of said first and second reactants.

11. A method for producing a population inversion in a laser device by the reacting of first and second gases to vibrationally excite a third gas including the steps of:
   supplying the first, second and third gases to supply means located in the interior of the laser device;
   radially delivering the first gas from the supply means;
   radially delivering the third gas from the supply means;
   mixing and radially expanding the first and third gas to a desired Mach number;
   reacting the second gas with the expanded first gas in an exothermic reaction whereby the third gas is vibrationally excited to produce a population inversion.

12. The method of claim 11 wherein the exothermic reaction is initiated by an electric discharge.

13. A method for producing a population inversion in a laser device by electrically exciting a gas including the steps of:
   supplying the gas to supply means located in the interior of the laser device;
   passing an electrical discharge through the gas to excite the gas; and
   passing the excited gas through radially disposed sonic orifices.

14. In a laser device:
   first supply means for radially delivering and expanding a first reactant;
   second supply means for introducing a second reactant into the radially expanded first reactant whereby said first and second reactants react to produce a population inversion.

15. The device of claim 14 wherein the first supply means includes a plurality of radially disposed supersonic nozzles.

16. The device of claim 15 wherein the first and second supply means are surrounded by a shell which defines a generally annular cavity in which said first reactant expands and in which said first and second reactants react.

17. The device of claim 16 wherein the second supply means includes a plurality of radially extending nozzles which extend radially outward of said plurality of radially disposed supersonic nozzles and into the generally annular cavity.

18. The device of claim 17 further including diffuser blades located in the generally annular cavity radially outward of said plurality of radially extending nozzles.

19. The device of claim 17 wherein said plurality of radially extending nozzles are provided with fairings.

20. The device of claim 17 further including a laser oscillator having a generally annular output beam which is aligned with said generally annular cavity which defines a gain region and which acts as an amplifier.

21. The device of claim 15 further including a pair of annular mirrors axially and radially spaced from said first and second supply means.

22. The device of claim 14 further including means for dissociating the first reactant prior to the introducing of the second reactant into the radially expanded first reactant by the second supply means.

23. The device of claim 22 wherein said first and second supply means include a plurality of alternating interspaced circumferentially extending supersonic nozzles.

24. The device of claim 22 wherein said second supply means includes a plurality of axially separated members located radially outward of said first supply means and coacting to define a plurality of restrictions through which the expanded first reactant must pass prior to the introducing of the second reactant into the radially expanded first reactant by said second supply means.

25. In a laser device:
first supply means for radially delivering and expanding a first gaseous reactant;
second supply means for introducing second gaseous reactant into the radially expanded first gaseous reactant; and
third supply means for radially delivering a gas whereby when said first and second gaseous reactants react in an exothermic reaction, internal modes of the gas become excited to produce a population inversion.

26. The device of claim 25 further including means for electrically initiating the exothermic reaction.

27. In a laser device:
supply means for radially delivering and expanding first, second and third gases; and
electrical discharge means for initiating an exothermic reaction between the first and second gases whereby the third gas is vibrationally excited to produce a population inversion.

28. In a laser device:
supply means for radially delivering and expanding a gas and including means defining electrodes; and
means for producing electrical discharges between said electrodes whereby said gas is vibrationally excited to produce a population inversion.

* * * * *